Nov. 17, 1953

A. N. STANTON 2,659,863

POTENTIAL MEASURING DEVICE

Filed Dec. 19, 1949

INVENTOR.
Austin N. Stanton

Nov. 17, 1953     A. N. STANTON     2,659,863
POTENTIAL MEASURING DEVICE
Filed Dec. 19, 1949     4 Sheets-Sheet 2

*INVENTOR.*
Austin N. Stanton

Nov. 17, 1953

A. N. STANTON 2,659,863

POTENTIAL MEASURING DEVICE

Filed Dec. 19, 1949

INVENTOR.
Austin N. Stanton

Patented Nov. 17, 1953

2,659,863

UNITED STATES PATENT OFFICE 2,659,863

POTENTIAL MEASURING DEVICE

Austin N. Stanton, Garland, Tex.

Application December 19, 1949, Serial No. 133,874

10 Claims. (Cl. 324—99)

My invention relates to methods and apparatus for electrical prospecting and more particularly to a method and means for determining the presence of oil, mineral, and other subterranean deposits by measuring the variations in the vertical potential gradient in the atmosphere near the surface of the earth.

It has long been known that the earth's surface is negatively charged and that there is a continual conduction of negative electricity away from the earth. This upward flow of current through the atmosphere produces a vertical potential gradient in the atmosphere of approximately 150 volts per meter because of the high resistivity of the atmosphere. The total amount of current flowing from the earth's surface amounts to about one thousand amperes or about five millionths of an ampere per square mile of the earth's surface. The source of the negative charge is still a matter of conjecture but it appears to be well established that it is generated in the interior of the earth. The potential of the earth is not uniform over its surface but varies from place to place on the earth's surface and the potential at any one point of the earth's surface also varies from time to time. The amount of current flowing vertically through the atmosphere varies therefore from place to place in accordance with the variations in the earth's potential from place to place and this change in the amount of current flowing vertically through the atmosphere results in variations in the vertical potential gradient of the atmosphere near the earth's surface. In accordance with my invention, the variations in the earth's potential between different points of the earth's surface, as reflected in the variations in the vertical potential gradient of the atmosphere above those points on the earth's surface, are utilized to determine the presence of oil, mineral, and other subterranean deposits. While the variations in the earth's potential, and therefore in the vertical potential gradient of the atmosphere, may be of considerable magnitude, the current flowing vertically through the atmosphere at any one point above the surface of the earth is exceedingly small. It is therefore necessary that the device employed to measure the earth's potential constitute no appreciable current drain since otherwise it will be impossible to measure the variations in the earth's potential with any degree of accuracy.

Accordingly, it is an object of my invention to provide a new and improved method of prospecting.

It is another object of my invention to provide a new and improved method of electrical prospecting.

It is another object of my invention to provide a new and improved method of electrical prospecting by measuring the variations in the potential of the earth over a given area of the earth's surface.

It is another object of my invention to provide a new and improved method of electrical prospecting for determining the presence of oil, mineral and other subterranean deposits by measuring the variations in the potential of the earth over a given portion of the earth's surface.

It is still another object of my invention to provide a new and improved method of electrical prospecting for determining the presence of subterranean bodies by measuring the variations in the vertical potential gradients of the atmosphere near the earth's surface.

It is another object of my invention to provide a new and improved potential measuring device for measuring the potential gradient between two points.

It is another object of my invention to provide a new and improved potential measuring device.

It is another object of my invention to provide a new and improved potential measuring device which draws substantially no current from the source of potential being measured.

It is another object of my invention to provide a new and improved potential measuring device whose accuracy is not changed appreciably by changes in the electrical qualities or quantities of the elements of the potential measuring device.

It is still another object of my invention to provide a new and improved potential measuring device which measures directly small potentials and small potential changes without drawing any substantial amount of current from the source of potential being measured.

In accordance with my invention, a record is made of the variations in the potential of the earth over a particular portion of the earth's surface as the potential measuring device is transported through the atmosphere over that portion of the earth's surface. The potential of a particular point of the earth's surface is a function of the resistivity of that portion of the earth which lies between the earth's surface and the source of the negative potential which is positioned somewhere in the interior of the earth. A sharp variation in the potential of the earth between two points on the earth's surface indicates a difference in resistivity of the earth in the portion of the earth lying beneath and between the two points. The change in resistivity may be caused by a subterranean deposit of a substance of either great or small resistance. A pool of oil or a layer of oil bearing sand or shale will cause a decrease in the potential of that portion of the earth's surface which is directly above the pool or layer since oil is a substance having a comparatively large electrical resistance. On the other hand, a deposit of metal bearing ore will cause an increase in the potential of that portion of the earth's surface which lies above the deposit since metal bearing ores offer a comparatively low resistance to an electrical current.

The variations in the earth's potential over a given portion of the earth's surface are measured by means of a new and improved potential measuring device which comprises an input plate and a sampling plate between which is impressed the potential difference of the earth's atmosphere between two vertically spaced points, and an adjacent plate on which is impressed a comparison potential. The sampling plate is moved alternately into position adjacent the input plate and the adjacent plate. An alternating current is induced in the sampling plate which varies in accordance with the difference between potential impressed on the input plate and the comparison potential. The induced alternating current is amplified and rectified and the rectified current is impressed on the control grid of an electric discharge means which is connected across a source of comparison potential and across the input and sampling plates. The electric discharge means controls the value of the comparison potential and maintains it at a value which very closely approaches the value of the potential impressed on the input plate. A measuring device, such as a voltmeter, is connected across the electric discharge means to measure the comparison potential and in this way measure the unknown potential gradient between the two vertically spaced points in the earth's atmosphere. The variations in potential of the given area of the earth's surface as reflected in the variations in the potential gradient of the atmosphere above the given area as determined by my potential measuring device are charted in any suitable manner. The earth potential chart indicates points of change in the earth's potential along the earth's surface thereby indicating changes in the resistivity of the earth directly below the points of change in the earth's potential. Since the potential of the earth at a given point on the earth's surface may vary with the passage of time, it is sometimes necessary to employ at least two potential measuring devices one of which is stationed within the area of the earth's surface whose variations in the potential of the earth are to be measured. The other potential measuring device is transported over the area and continuous records are made of the readings of the two measuring devices during the time the second potential measuring device is being transported. The two records are then compared and the variations in the potential recorded by the stationary potential measuring device are employed to correct the record obtained by the transported potential measuring device to eliminate the variations in the readings due to the fluctuation of the earth's potential over the given area with the passage of time. It may sometimes be desirable to employ more than one movable potential measuring device so that the time needed to measure the variations in the earth's potential over the given area may be appreciably decreased.

For a better understanding of my invention, reference may be had to the following description taken in connection with the accompanying drawing and its scope will be pointed out in the appended claims.

Figure 1:
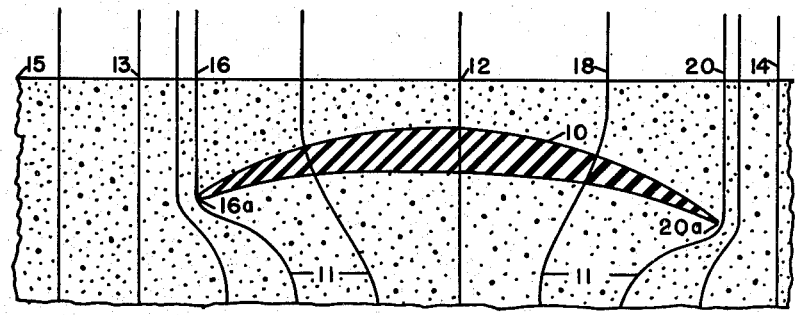
Figure 1 is a vertical sectional view of the earth's structure, taken along the profile line 1—1 of Figure 3, showing a characteristic oil bearing formation.

Figure 1 shows a typical oil bearing formation 10 which is substantially dome shaped. The variations in the potential of the earth and the variations in the potential gradient of the atmosphere above the oil bearing formation 10 are due in large part to the variations in the density of passage of electrons through the earth and the atmosphere. The electrons originating within the interior of the earth are represented by lines 11 which show their course of travel. Since the oil bearing formation 10 offers a high resistance path to the electrons originating within the interior of the earth, comparatively very few electrons will pass through the earth formations immediately above oil bearing formation 10 into the atmosphere. The potential of the earth at point 12 immediately above formation 10 will therefore be less than at points 13 and 14 which lie above portions of the earth's structure which offer less resistance to the electrons originating within the interior of the earth. The vertical potential gradient of the atmosphere varies in accordance with the number of electrons emitted from the earth and therefore the potential gradient of the atmosphere immediately above point 12 will be smaller than the potential gradients above points 13 and 14.

Figure 3:
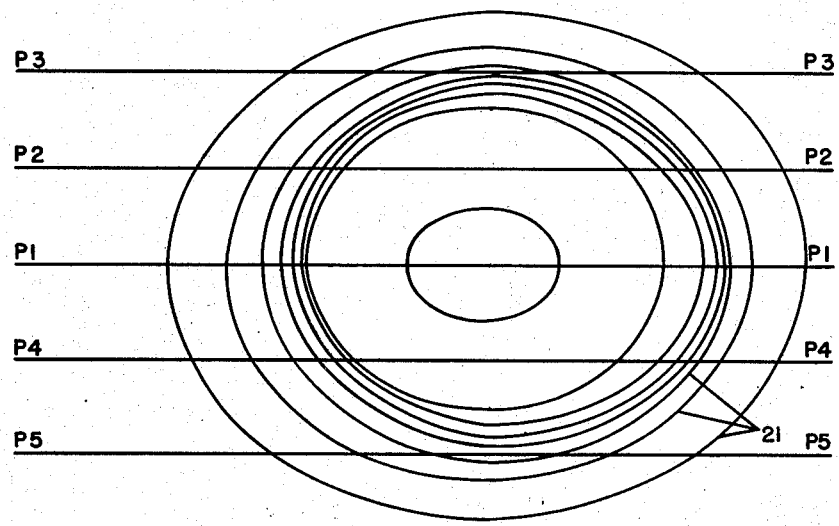
Figure 3 is a plan view of the portion of the earth's surface including that shown in vertical section in Figure 1.
Figure 2:
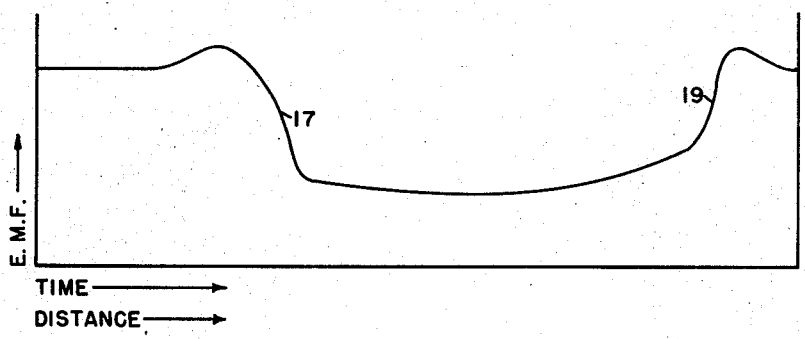
Figure 2 shows a characteristic potential variation curve taken along the same profile line as the sectional view of Figure 1.

If a potential measuring device is transported above the earth's surface along the line 1—1 of Figure 3 and a continuous record, as shown in Figure 2, of the vertical potential gradient of the atmosphere is made by the potential measuring device, the record will show that the vertical potential gradient of the atmosphere and, therefore, the earth's potential, between points 15 and 16 is comparatively high since a relatively large number of electrons pass upwardly through the atmosphere between points 15 and 16. The potential gradient increases as point 16 is approached because some of the electrons which originate directly below oil leaving formation 10, seeking paths of lower resistance in their upward passage than the high resistance path through oil bearing formation 10, pass around edge 16a of the formation 10. Beyond point 16 the number of electrons passing upwardly into the atmosphere decrease very rapidly since the resistivity of the earth is greatly increased by oil bearing formation 10.

The increase in the resistivity of the earth caused by the oil bearing formation and the hydrocarbon compounds impregnating earth formations above the oil bearing formations is reflected in the potential gradient of the atmosphere recorded by the potential measuring device which decreases rapidly as indicated at 17 on the potential curve of Figure 2. The potential gradient measured above oil bearing formation 10 will remain low until the point 18 is approached where it will begin to increase rapidly as indicated at 19 on the potential curve of Figure 2. The potential gradient will continue to increase until point 20 is reached since point 20 lies above and slightly beyond the boundary 20a of oil bearing formation 10.

The potential curve shown in Figure 2 is plotted with the ordinates representing potential and the abscissae representing distance. The potential of the earth over a given portion of the earth as reflected by the vertical potential gradient of the atmosphere above the given area may be measured and recorded above several profile lines $P_1$ and $P_5$. Equipotential lines 21 may then be drawn on a plan view of the given portion of the earth from the potential curves obtained along profile lines $P_1$ to $P_5$, as is shown in Figure 3. Figure 3 clearly indicates the areas of greatest variation in potential gradient of the atmosphere and therefore the greatest variations in the potential of the earth. These areas delineate the boundaries of the oil bearing formation 10.

Figure 4:
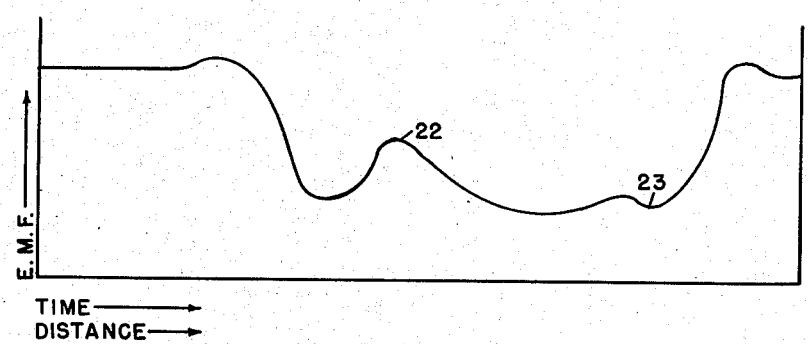
Figure 4 shows a characteristic potential curve obtained by continuously recording the vertical potential gradient of the atmosphere as the potential measuring device is transported over the earth's surface.
Figure 5:
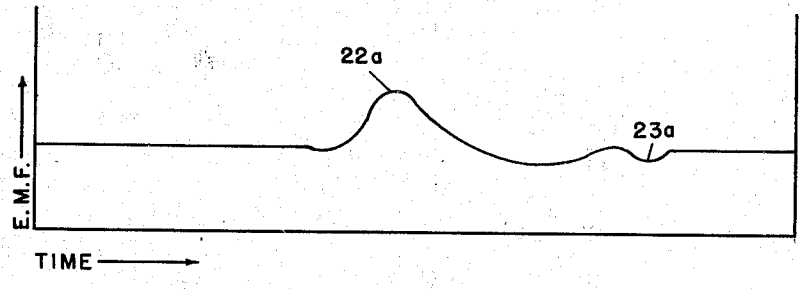
Figure 5 shows a characteristic potential curve obtained by recording the vertical potential gradient of the atmosphere by means of a stationary potential measuring device during the time the curve of Figure 4 is being obtained.

If the potential curves along lines $P_1$ to $P_5$ are all taken in a very short time or during a time when the potential of the earth is relatively stable, it is not necessary to take into account the fluctuations of the earth's potential with time. Should it be necessary to correct the potential curves for errors introduced by the fluctuation of the earth's potential, a second stationary potential measuring device may be employed to record the vertical potential gradient of the atmosphere at the point at which it is located simultaneously with the measurement and recordation of the vertical potential gradients of the atmosphere along profile lines $P_1$ to $P_5$. For example, suppose that the potential curve taken along line $P_1$ were that shown in Figure 4. If the potential curve obtained simultaneously by a second stationary potential measuring device were that shown in Figure 5, it would be apparent that the changes in the vertical potential gradient of the atmosphere indicated at 22 and 23 correspond to the changes 22a and 23a and that these changes were not due to changes in the resistivity of the earth along line $P_1$ but were due to the fluctuations in the earth's potential. If the changes which are indicated in Figure 5 to be due solely to fluctuations of the earth's potential are algebraically subtracted from the potential changes shown in the potential curve of Figure 4, the resultant curve will indicate only potential changes due to changes of resistivity of the earth and the corrected curve will be that shown in Figure 2.

The stationary potential measuring device will be positioned within the area whose potential is being measured and will reflect the fluctuation in the earth's potential in the area.

In prospecting an area whose underground structure is unknown, a number of potential curves of the type disclosed in Figure 2 are obtained by transporting my potential measuring device above the area whose subterranean deposits are to be determined. The presence of subterranean oil bearing formations will be indicated by areas of low potential while formations of metal bearing ores will be indicated by high potentials. It will not be necessary in every case to draw a plan view showing equipotential lines, such as shown in Figure 3, since with practice, potential curves of the type shown in Figures 2, 4 and 5 can be analyzed to yield the desired information about the structure of the earth without the drawing of plan views of the type shown in Figure 3.

The potential measuring device employed in my method of electrical prospecting must be very sensitive but must draw substantially no current from the source of potential being measured since the current emitted from the earth at any one point is exceedingly small.

Figure 6:
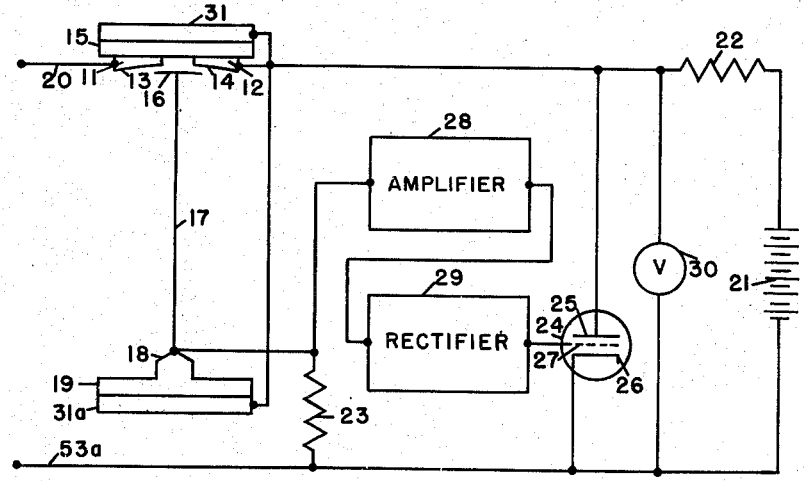
Figure 6 illustrates diagrammatically a preferred embodiment of my new and improved potential measuring device.

Figure 6 illustrates diagrammatically a preferred embodiment of my invention for measuring potentials without drawing a substantial amount of current from the source of potential being measured. This device was disclosed in my abandoned application Serial Number 554,463 filed September 16, 1944. The device comprises a pair of metal blocks or plates 11 and 12 having arcuate surfaces 13 and 14, respectively, which are mounted on an insulating block 15 which may be of any suitable insulating material, such as polystyrene, amber, or quartz. A third electrostatic plate 16 is mounted on a spring 17 which has a lower rigid portion 18 mounted on an insulating block 19. The third plate 16 may be formed by suitably bending the upper portion of spring 17. Spring 17 and plate 16 are mounted adjacent plates 11 and 12 in such a manner that plate 16 is moved periodically and alternately to positions adjacent plates 11 and 12 when spring 17 is vibrated. Spring 17 may be vibrated by simply displacing plate 16 manually, by a solenoid (not shown), or by any suitable mechanical means. Plate 16 could also be mounted for rotary movement if desired in a manner which will be described below.

The plate 11, which may be termed the input plate, is connected to the source of potential to be measured by a suitable input lead or terminal 20. The adjacent plate 12 is connected to a source 21 of direct current potential through a resistance 22. The movable plate 16, which may be termed the sampling plate, is also connected to the source 21 of direct current potential through a resistance 23 which is of high value and which serves as a load resistance.

If the unknown potential impressed on input plate 11 and the comparison potential impressed on adjacent plate 12 differ in value, an alternating current is induced electrostatically in plate 16 during its periodic movement from a position adjacent the input plate to a position adjacent the adjacent plate and vice versa. It will be well understood by those skilled in the art that the potential of the alternating current induced in plate 16 will vary directly as the difference between the unknown potential and the comparison potential. In other words, the greater the difference between the unknown potential and the comparison potential, the greater the potential of the alternating current induced in sampling plate 16.

In order to maintain the comparison potential impressed on adjacent plate 12 very closely equal to the unknown potential impressed on input plate 11, I provide an electric discharge means 24 which may comprise an anode 25, a cathode 26 and a control grid 27 and which may be of any of the several types well known in the art, although I prefer to utilize an electric discharge means of the high vacuum type. The anode 25 is connected to the adjacent plate 12 through block 14 and to the positive side of source 21 through resistance 22. The cathode 26 is connected to the rigid portion 18 of spring 17 through resistance 23 and is also connected to the negative side of source 21.

The alternating current potential induced in plate 16 is transmitted through spring 17 to an amplifier 28 where it is amplified. The amplified alternating current potential is then transmitted to a rectifier 29 where it is changed to a negative potential which is then impressed on control grid 27. Extreme amplification of the alternating current by amplifier 28 is not necessary since electric discharge means 24 also acts as an amplifier. It will be readily apparent that the negative potential impressed on control grid 27 will vary in accordance with the difference between the unknown potential of plate 11 and the comparison potential of plate 12 and that the resistance of electric discharge means 24 will, therefore, also vary in accordance with the difference. A variation in the resistance of electric discharge means 24 will result in a variation in the comparison potential impressed on adjacent plate 12. For example, if the unknown potential becomes significantly greater than the comparison voltage impressed on adjacent plate 12, the potential of the alternating current induced in sampling plate 16 is increased, the negative potential impressed on control grid 27 is increased and raises the resistance of electric discharge means 24 thereby decreasing the current transmitted by electric discharge means 24. The potential of anode 25 and adjacent plate 12 are therefore increased since with the decrease of current transmitted by electric discharge means 24 the voltage drop through resistance 22 is decreased. The comparison potential is increased until the difference between the unknown potential and the comparison potential becomes so small that the alternating current potential induced in sampling plate 16 is just able to maintain the resistance of electric discharge means 24 at a constant value.

A potential measuring means 30 which may be a directly read voltmeter or a recording voltmeter, is connected across electric discharge means 24 to measure the comparison potential impressed on adjacent plate 12. In the above described embodiment of my invention, the comparison potential is always smaller than the unknown potential but the difference between the unknown potential and the comparison potential can be made so small by proper selection of the various elements of the device that it may be entirely disregarded and the reading of the voltmeter taken as the unknown potential. If the difference between these two potentials is appreciable, however, the constant difference may be added to the voltmeter reading, or the voltmeter may be adjusted by changing its zero setting to add the value of the difference to the reading. The difference between the two potentials may also be electrically added to the voltmeter reading in any conventional manner, for example, by the use of a battery in the circuit of the measuring means 30.

The insulators 15 and 19 are mounted on blocks 31 and 31a which may be of suitable conducting metal. The blocks 31 and 31a are connected to the plate 12 and therefore have impressed upon them the comparison potential. The potential gradients in the insulating blocks 15 and 19 are kept to a very small value because the difference between the potentials impressed on plate 11 and plate 12 is kept very small. The potential gradient in all insulators employed to interpose an electrical barrier between terminal 20 and its input plate 11 and other parts of the apparatus or ground are similarly kept at a minimum value by maintaining one side of all such insulators at the comparison potential. The drain upon the source of potential to be measured is thus kept very small. In order to further minimize this drain upon the source of unknown potential, a metallic shield (not shown) may be employed to enclose plates 11, 12 and 16 and their supporting structures. The metallic shield is also maintained at a potential which is equal to the potential impressed on adjacent plate 12.

A gain control (not shown in Figure 6) may be provided in the amplifier in order that the comparison potential impressed on adjacent plate 12 may be brought up slowly to the potential of input plate 11. This is necessary in order to prevent the comparison potential from exceeding, even momentarily, the unknown potential. If the comparison potential exceeds the unknown potential, the potential impressed on the anode 25 and plate 12 will continue to increase until the negative potential impressed on control grid 27 will rise to such a value as to render electric discharge means 24 non-conductive. If this occurs, the gain must be reduced until the potential impressed on adjacent plate 12 falls below the potential impressed on plate 11. The gain must then be slowly increased until no increase in the potential impressed on plate 12 is shown with increased gain. A short circuiting switch in the rectifier or amplifier may be employed in place of the gain control if desired.

A sharp band pass filter (not shown) may be incorporated in amplifier 28 to pass only the fundamental frequency of plate 16, thereby excluding harmonics, static and other extraneous disturbances.

A bias battery may be connected between rectifier 29 and control grid 27 and a positive potential derived from rectifier 29. In this case, the comparison potential impressed on plate 12 would always be higher than the unknown potential impressed on plate 11. The illustrated embodiment of my invention is preferred, however, in order to save the cost of a bias battery and to minimize the weight and bulk of the potential measuring device.

It will be readily apparent that variations in the values or characteristics of the elements of the potential measuring device will have little or no effect upon the accuracy of measurement. The conversion factor of plates 11, 12 and 16, the overall gain of amplifier 28, the efficiency of rectifier 29, and the characteristics of electric discharge means 24 determine the difference between the unknown potential and the comparison potential. Since the difference between these potentials is very small, a variation in any one of the above mentioned elements or values will produce no significant variation in the accuracy of the device.

Variations in the frequency and amplitude of oscillation of plate 16 do not affect the accuracy of measurement. My potential measuring device is so independent of the frequency and amplitude of oscillation of plate 16, that accurate readings may be taken by simply displacing plate 16 manually and taking the readings while the plate 16 continues to oscillate due to its own stored energy.

Figure 7:
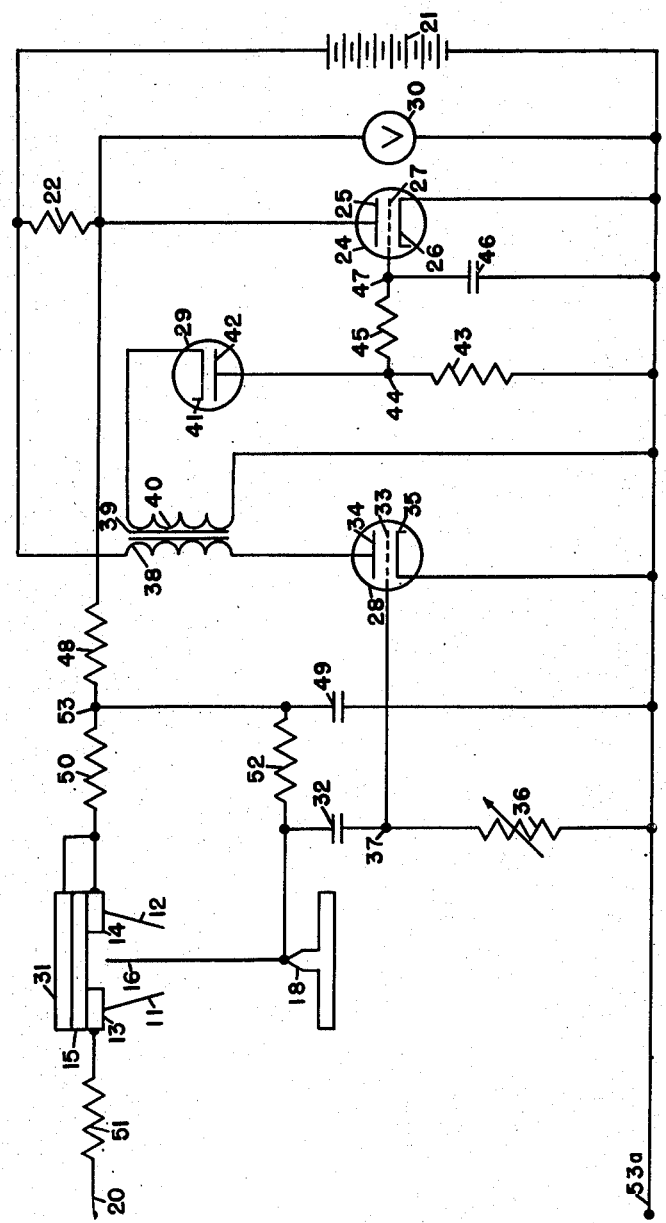
Figure 7 illustrates diagrammatically a modified form of the device shown in Figure 6.

Figure 7 illustrates diagrammatically a complete circuit of my potential measuring device which embodies certain refinements not illustrated in Figure 6. Like reference characters designate like elements in Figures 6 and 7. Input plates 11 and 12 are inwardly inclined toward each other and the upward extension of spring 17 constitutes the sampling plate 16. As sampling plate 16 oscillates it alternately approaches plates 11 and 12. The lower rigid portion 18 of spring 17 is connected to a control grid 33 of the amplifier 28 through a coupling condenser 32. Amplifier 28 may be an electric discharge means of any of the types well known in the art and comprises an anode 34 and a cathode 35. A variable resistance 36 is connected between the common connection or junction 37 of coupling condenser 32 and control member 33 and the cathode 35. The variable resistance 36 is employed as a gain control for the amplifier 28. The anode 34 is connected to the positive side of the source 21 of direct current through the primary winding 38 of the transformer 39. One side of the secondary winding 40 of transformer 39 is connected to the cathode 41 of the rectifier 29 which may be an electric valve of any of the types well known in the art and which comprises an anode 42. The other side of secondary winding 40 is connected to the anode 42 through a current limiting resistance 43. The common connection or juncture 44 of anode 42 and resistance 43 is connected to control grid 27 of electric discharge means 24 through a resistance 45.

When sampling plate 16 is set in oscillation, an alternating current is induced in sampling plate 16 and transmitted to control means 33 through coupling condenser 32. The alternating current potential impressed on control member 33 controls the current flowing through amplifier 28 and primary winding 38. The current flowing through primary winding 38 and amplifier 28 varies in accordance with the potential impressed on control member 33. Since amplifier 28 is a unidirectional conductor, a unidirectional pulsating current flows in primary winding 38. Rectifier 29 is also a unidirectional conductor and transmits only one half cycle of the alternating current induced in secondary winding 40 so that a direct current potential is impressed on control grid 27. The direct current potential impressed on control grid 27 varies in accordance with the conductivity of amplifier 28 and therefore with the potential of the alternating current generated in sampling plate 16.

In order to increase the time required to produce response of the electric discharge means 24 to variations in the unknown potential applied to input terminal 20, I provide a time delay circuit which comprises resistance 45 and a capacitance 46 connected between the control grid 27 and anode 42. Capacitance 46 is connected between the common connection 47 and cathode 26. Resistance 45 and capacitance 46 also prevent regeneration by preventing passage of the fundamental frequencies of plate 16 through electric discharge means 24 and the capacitance between plates 12 and 16 to the control grid 33 input of the amplifier 28.

A similar time delay circuit comprising a resistance 48 connected between anode 25 and block 14 and a capacitance 49 connected across the electric discharge means 24 is provided to reduce the variations of comparison potential at block 14. The time constant of this time delay circuit is made approximately equal to that of the time delay circuit comprising resistance 45 and capacitance 46.

I also provide an isolating resistance 50 of very high value connected between block 14 and resistance 48 to cause a short duration change in the potential applied to plate 11 to induce a similar short duration change in the potential applied to plate 12. The isolating resistance 50 is sometimes necessary to prevent sudden changes in the unknown potential from causing the potential of input plate 11 to become lower than the potential of plate 12. As explained above, if the potential applied to plate 12 exceeds the unknown potential applied to plate 11, the electric discharge means 24 will be rendered nonconductive and the potential measuring device will become inoperative. In order to further decrease the likelihood of this occurrence, I provide a resistance 51 between the input lead or terminal 20 and the input plate 11. The resistance 51 and the capacitance of input plate 11 form a time delay circuit whose time constant is of approximately the same order as that of the time delay circuit comprising resistance 45 and capacitance 46. Resistance 51 and the capacitance of plate 11 smooth out variations of short duration in the unknown potential which reaches terminal 20 and which would otherwise be impressed on input plate 11. Sampling plate 16 is connected to the juncture or common connection 53 of resistances 50 and 48 in order to maintain plate 16 at the same direct current potential as plate 12. The value of resistance 52 is great enough to prevent passage of the alternating current generated in sampling plate 16.

The measuring means 30 may be a conventional voltmeter, which may be read directly, or a recording voltmeter, for example, a voltmeter which controls a beam of light projected onto a moving strip of photosensitized film. Since the potential gradients throughout the potential measuring device are kept extremely small and the voltmeter is energized from a source 21 of potential other than the source of unknown potential, the drain on the source of unknown potential is kept extremely small. The potential measuring device, therefore, is made extremely sensitive and accurate being independent of substantially all factors except the accuracy of the measuring means 30 itself.

In operating my potential measuring device to determine the variations in potential of a given area of the earth's surface, the terminals 20 and 53a are kept vertically separated, terminal 20 being directly above terminal 53a. My potential measuring device then measures the potential of the atmosphere between the terminals 20 and 53a. Since the distance separating terminals 20 and 53a is kept constant, the reading obtained by measuring device 30 may be regarded as a measure of the vertical potential gradient of the atmosphere and plotted to give the curves shown in Figures 1 to 5. Since potentials indicated by my potential measuring device vary in accordance with the potential difference between terminals 20 and 53a and therefore with the vertical potential gradient of the atmosphere, and since the vertical potential gradient of the atmosphere varies in accordance with the potential of the earth's surface, the readings obtained by measuring device 30 indicate variations in the potentials of the earth's surface.

Figure 8:
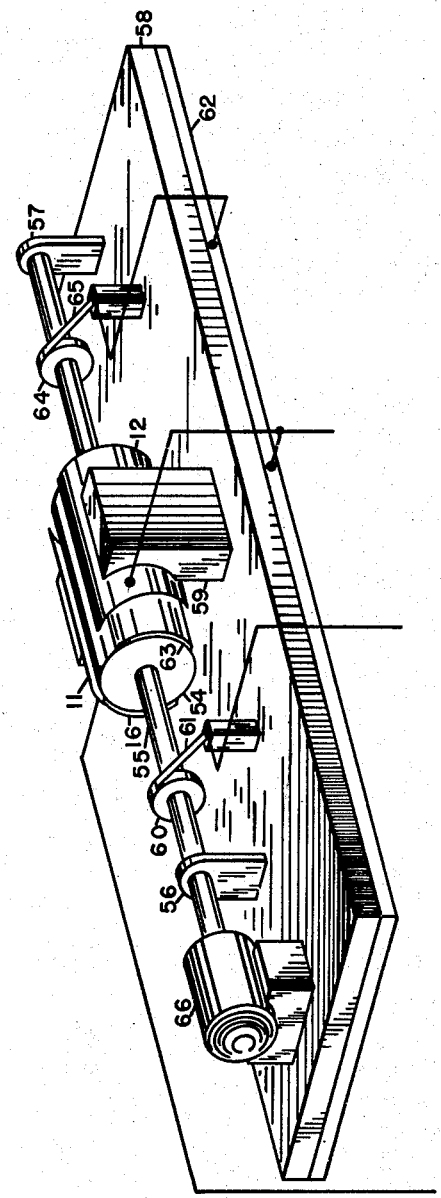
Figure 8 is a fragmentary perspective view of a modified form of the device shown in Figure 6.

Figure 8 illustrates a further modification of my potential measuring device in which the sampling plate 16 is mounted on a solid rotor which is made of a suitable insulating material. Rotor 54 is mounted on shaft 55 for rotary movement about its longitudinal axis. Shaft 55 is journaled in upright supporting members 56 and 57 which are mounted on insulator block 58. Input plate 11 and adjacent plate 12 are sections of a cylinder and are mounted on insulator blocks 59 (only one of which is visible in Figure 8). Plates 11 and 12 are positioned on opposite sides of rotor 54 so that the center of the circle of which they constitute two segments coincide with the longitudinal axis of rotor 54.

Sampling plate 16, which is fixed to rotor 54, covers only a longitudinal portion of the surface of rotor 54 and is also curved so that its center of curvature coincides with the longitudinal axis of rotor 54. The alternating current generated in plate 16 as it is revolved past plates 11 and 12 is transmitted to the amplifier 28 through a slip ring 60 and brush 61.

As in the embodiments of my invention illustrated in Figures 6 and 7, the potential gradients in the insulator block 58 are reduced to a minimum by mounting block 58 on a metal plate 62. Plate 62 is connected to plate 12 in order to maintain metal plate 62 at the potential of plate 12.

A plate 63 is mounted on rotor 54 opposite plate 16 in order to balance the rotor 54. Plate 63 is connected to metal plate 62 through a slip ring 64 and brush 65 in order to discharge the alternating current induced in plate 63 as it revolves past plates 11 and 12. Rotor 54 may be driven by any suitable prime mover, for example, an electric motor 66.

The device illustrated in Figure 3 operates in exactly the same electrical manner as the devices illustrated in Figures 6 and 7. Since the potentials of input plates 11 and adjacent plate 12 differ in value, an alternating current is induced electrostatically in plate 16 as it alternately approaches plates 11 and 12. The alternating current induced in plate 16 is utilized to measure the potential on input plate 11 in the manner illustrated in Figures 6 and 7.

My potential measuring device is ideally suited to my method of electric prospecting since it constitutes substantially no drain on the source of potential being measured and since it is light and easily transported. My potential measuring device can be carried above the surface of the earth in any desired manner, for example by an automobile or airplane, and will record the potential of the earth continuously as it is being transported.

While I have shown and described a preferred method and a preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a potential measuring device: an insulator; an input plate and an adjacent plate mounted on said insulator; a sampling plate adapted to be moved alternately to positions adjacent said input plate and said adjacent plate; means for amplifying and rectifying the alternating current generated by the movement of said sampling plate; means for converting the output of said rectifying means to a potential approaching that of said input plate and applying said potential to said adjacent plate and said sampling plate; means for applying said potential across said insulator for minimizing the potential gradients in said insulator; and means operatively associated with said adjacent plate for measuring the potential of said input plate by measuring the potential of said adjacent plate.

2. In a potential measuring device: an insulator; an input plate and an adjacent plate mounted on said insulator; a sampling plate adapted to be moved alternately into positions adjacent said input plate and said adjacent plate; means for amplifying and rectifying the alternating current generated by the movement of said plate; means for converting the output of said rectifying means to a potential approaching that of said input plate and applying said potential to said adjacent plate and said sampling plate; means for applying said potential across said insulator for minimizing the potential gradients in said insulator; means for lengthening the time required to affect the converting means; and means operatively associated with said adjacent plate for measuring the potential of said input plate by measuring the potential of said adjacent plate.

3. In a potential measuring device: an insulator; an input plate and an adjacent plate mounted on said insulator; a sampling plate adapted to be moved alternately to positions adjacent said input plate and said adjacent plate; means for amplifying and rectifying the alternating current generated by the movement of said sampling plate; means for converting the output of said rectifying means to a potential approaching that of said input plate and applying said potential to said adjacent plate and said sampling plate; means for applying said potential across said insulator for minimizing the potential gradients in said insulator; means operatively associated with said adjacent plate for measuring the potential of said input plate by measuring the potential of said adjacent plate; and means for lengthening the time required for the output of said converting means to affect the potential of said adjacent plate.

4. In a potential measuring device: an insulator; an input plate and an adjacent plate mounted on said insulator; a sampling plate adapted to be moved alternately to positions adjacent said input plate and said adjacent plate; means for amplifying and rectifying the alternating current generated by the movement of said sampling plate; means for converting the output of said rectifying means to a potential approaching that of said input plate and applying said potential to said adjacent plate and said sampling plate; means for applying said potential across said insulator for minimizing the potential gradients in said insulator; means operatively associated with said adjacent plate for measuring the potential of said input plate by measuring the potential of said adjacent plate; and a high resistance between the adjacent plate and the output of the converting means to allow sudden changes in input potential to induce similar potential changes in said adjacent plate.

5. In a potential measuring device: an insulator; an input plate and an adjacent plate mounted on said insulator; a sampling plate adapted to be moved alternately to positions adjacent said input plate and said adjacent plate; means for amplifying and rectifying the alternating current generated by the movement of said sampling plate; means for converting the output of said rectifying means to a potential approaching that of said input plate and applying said potential to said adjacent plate and said sampling plate; means for applying said potential across said insulator for minimizing the potential gradients in said insulator; means operatively associated with said adjacent plate for measuring the potential of said input plate by measuring the potential of said adjacent plate; and a high resistance preceding the input plate to minimize changes of potential reaching said input plate from the source being measured.

6. In a device for measuring an unknown potential: a first means to which a source of said unknown potential may be connected; a second means adjacent said first means to which a comparison voltage is applied; alternating current generating means operatively associated with said first and second means for supplying alternating current whose voltage varies in accordance with the difference in potential between said first and second means; an electric discharge means operatively associated with said second means and said generating means comprising an anode, a cathode and a control grid; means to amplify and rectify said alternating current for supplying a direct current potential to said control grid, said electric discharge means controlling said comparison potential to make it substantially equal to said unknown potential; time delay means connected to said control grid for delaying the response of said electric discharge means upon change of unknown potential, said electric discharge means and said last mentioned means being electrically isolated from said first means; and measuring means operatively associated with said second means for measuring said unknown potential by measuring said comparison potential.

7. In a device for measuring an unknown potential: a first means to which a source of said unknown potential may be connected; a second means adjacent said first means to which a comparison voltage is applied; alternating current generating means operatively associated with said first and second means for supplying alternating current whose voltage varies in accordance with the difference in potential between said first and second means; an electric discharge means operatively associated with said second means and said generating means comprising an anode, a cathode and a control grid; means to amplify and rectify said alternating current for supplying a direct current potential to said control grid, said electric discharge means controlling said comparison potential to make it substantially equal to said unknown potential, said electric discharge means and said last mentioned means being electrically isolated from said first means; means between said second means and said anode for allowing a sudden change in said unknown potential to induce a similar change in said comparison potential; and measuring means operatively associated with said second means for measuring said unknown potential by measuring said comparison potential.

8. In a device for measuring an unknown potential: a first means to which a source of said unknown potential may be connected; a second means adjacent said first means to which a comparison voltage is applied; alternating current generating means operatively associated with said first and second means for supplying alternating current whose voltage varies in accordance with the difference in potential between said first and second means; an electric discharge means operatively associated with said second means and said generating means comprising an anode, a cathode and a control grid; means to amplify and rectify said alternating current for supplying a direct current potential to said control grid, said electric discharge means controlling said comparison potential to make it substantially equal to said unknown potential; a time delay means interposed between said first means and said source of said unknown potential for delaying the response of said electric discharge means upon change of said unknown potential; and measuring means operatively associated with said second means for measuring said unknown potential by measuring said comparison potential.

9. In a device for measuring an unknown potential: a first means to which a source of said unknown potential may be connected; a second means adjacent said first means to which a comparison voltage is applied; alternating current generating means operatively associated with said first and second means for supplying alternating current whose voltage varies in accordance with the difference in potential between said first and second means; an electric discharge means operatively associated with said second means and said generating means comprising an anode, a cathode and a control grid; means to amplify and rectify said alternating current for supplying a direct current potential to said control grid, said electric discharge means controlling said comparison potential to make it substantially equal to said unknown potential; time delay means connected to said control grid for delaying the response of said electric discharge means upon change of said unknown potential; means between said second means and said anode for allowing a sudden change in said unknown potential to induce a similar change in said comparison potential; a second time delay means interposed between said first means and said source of said unknown potential for delaying the response of said electric discharge means upon change of said unknown potential; and measuring means operatively associated with said second means for measuring said unknown potential by measuring said comparison potential.

10. In a device for measuring an unknown potential; an insulator; a first means to which an unknown potential is applied mounted on one side of said insulator; a second means to which a comparison potential is applied also mounted on said one side of said insulator; a third means operatively associated with said first and second means and responsive to the difference between said unknown potential and said comparison potential for controlling said comparison potential to make it substantially equal to said unknown potential; means connecting said third means to said insulator for applying said comparison potential across said insulator for minimizing the potential gradient in said insulator; and measuring means operatively associated with said second means for measuring said unknown potential by measuring said comparison potential.

AUSTIN N. STANTON.

References Cited in the file of this patent

UNITED STATES PATENTS

| Number | Name | Date |
|---|---|---|
| 2,269,225 | Rich | Jan. 6, 1942 |
| 2,270,991 | Bagno | Jan. 27, 1942 |
| 2,272,914 | Keeler | Feb. 10, 1942 |
| 2,440,693 | Lee | May 4, 1948 |
| 2,449,068 | Gunn | Sept. 14, 1948 |
| 2,454,911 | Clewell | Nov. 30, 1948 |
| 2,459,196 | Stewart | Jan. 18, 1949 |
| 2,490,579 | Clewell | Dec. 6, 1949 |